Patented Oct. 2, 1928.

1,685,797

UNITED STATES PATENT OFFICE.

SHELDON S. YATES, OF ENGLEWOOD, NEW JERSEY, ASSIGNOR TO CHICLE DEVELOPMENT COMPANY, OF NEW YORK, N. Y., A CORPORATION OF DELAWARE.

JELUTONG PRODUCT AND METHOD OF MAKING THE SAME.

No Drawing.   Application filed September 24, 1927. Serial No. 221,859.

This invention relates to a new Jelutong product and to a method of making the same.

Jelutong (or Pontianac) while commonly grouped with other rubbers, because of its rubber content, differs radically from other commercial rubbers, such as plantation rubber, by its high resin content which forms by far the greater part of the total product; while other commercial rubbers such as plantation rubber are made up almost entirely of rubber and contain but small percentages of resin.

Moreover, Jelutong has been considered a gum that oxidizes very quickly and for that reason is specially treated to protect it as much as possible from oxidation. This protection has been effected by keeping the Jelutong sufficiently moist, e. g., with a moisture content of from 40 to 70% of water. The coagulated Jelutong is commonly pressed to remove part of the water from the coagulated product but so as to leave around 40% or more of water in the product in order to protect it against deterioration during shipment. When this moisture content is decreased by permitting the Jelutong to dry, the rubber in the Jelutong is in a relatively short time oxidized to such an extent that the rubber qualities decrease or disappear entirely, leaving nothing but resin. So far as I am aware, the only method that has been commercially used to reduce this objectionable oxidation and deterioration during transportation and storage has been to keep the Jelutong in a moist state with around 40 to 50% of moisture in it.

The Jelutong product so treated contains such a large amount of moitsure that the transportation charges are greatly increased, it being necessary to pay transportation charges on an amount of water practically equal to the weight of the Jelutong. Furthermore, the presence of such a large amount of moisture, while useful in retarding oxidation, nevertheless promotes or permits decomposition of other constituents of the crude product, giving to it a characteristic odor of the decomposition product and also a disagreeable taste. Such crude products, if they undergo oxidation to any considerable extent, have a pronounced bitter taste. Before such products can be used commercially, particularly in the chewing gum industry, it is necessary to subject them to refining processes which are expensive and even the refined product may not be entirely free from taste and flavor.

In spite of these objections, a large tonnage of the product has been produced and shipped and used; and the industry has considered it necessary to produce and ship and use a product of this kind.

The present invention enables the objections to the present day Jelutong products to be overcome or minimized and provides a new and improved Jelutong product which is stable and resistant to deterioration and which can be shipped and stored in a practically water free condition.

According to the present invention the Jelutong latex is coagulated, and the coagulated product melted and dried until it is free or nearly free from water, whereupon it is cast into solid cakes.

While it is matter of common knowledge in the trade that the reduction in the moisture content of coagulated Jelutong below about 40% will cause oxidation of the Jelutong, I have discovered that this oxidation does not take place provided the Jelutong is melted and cast into solid masses with the moisture content reduced during the melting period until the product is bone dry or contains only a very small percentage of moisture. I have further found that such a dried product, free or practically free from moisture content has such marked stability and resistance to oxidation that it can be readily shipped and stored in its practically water free condition without undergoing the objectionable deterioration from oxidation and from other causes characteristic of present day wet Jelutong products.

In carrying out the new process, the Jelutong latex can be coagulated by means of various coagulants, such as acetic acid, alum, gypsum, sulfuric acid, local fruit juices, etc. This coagulation can be carried out in the customary manner for coagulating and separating the Jelutong from the greater part of the water content of the latex.

Instead, however, of retaining in the coagulated latex upwards of about 40 or 45% of moisture to protect it from oxidation, I subject the coagulated Jelutong to a heating operation until it is melted and free from moisture or until the moisture content is reduced to such an extent, approximately 3% or less, that the product is a stable product. This melting and drying can be done in steam jacketed kettles, or in kettles heated by other means, thereby boiling out the moisture from the melted Jelutong; and this drying can be promoted by the use of a vacuum if desired. The melting and drying of the coagulated latex should take place before the coagulated material has undergone objectionable deterioration.

In melting the Jelutong and heating the same so as to expel the water in a steam jacketed kettle, I find that if the temperature of the steam is maintained at from 212° to 225° Fahr. good results are obtained. The time required varies with the steam temperature and the quantity treated. The Jelutong during the evaporation period is stirred by a suitable stirrer and the water is usually sufficiently driven off before the temperature of the Jelutong mass reaches the temperature of the steam. By the melting and water expelling operation the coagulated latex is reduced from around 60% of water to a practically bone dry state or to such a low percentage of water that it is practically free from objectionable tendency toward deterioration. A small percentage of moisture, substantially less than five per cent, may be left in the product, for example, up to around 3%, although even this amount of moisture may be more or less completely removed. The water content should, preferably, be as low as practicable and it is well to aim at making it not more than 3% of the mass.

When the melted product is sufficiently dried by the heating, the dried product is poured into boxes or other containers and allowed to cool.

A product made as above described and containing 3% or less of water is a solid compact product satisfactorily embodying my invention. It is somewhat brittle in character, but well adapted for transportation and storage. Such a product in a dry compact state is a new commercial product, and a product differing from any product which has heretofore been produced so far as I am aware. It has quite distinct properties from ordinary crude rubber. It is also an entirely different product from present day Jelutong products, in particular being free from the objectionable odor and taste of such product and requiring little or no refining to adapt it for use for chewing gum manufacture or for other purposes.

It will thus be seen that the invention provides a new but simple and effective method of treating Jelutong and a new and valuable Jelutong product resulting therefrom. The new product can be transported and stored without objectionable deterioration characteristic of present day Jelutong products.

It can moreover be readily transported without further attention or treatment, thereby radically reducing transportation charges as compared with present day wet Jelutong products. The product moreover, upon arrival at its destination, can be stored for long periods without deterioration and used with a minimum of refining as compared with the elaborate refining necessary with present day Jelutong products.

What I claim is:

1. The method of producing a Jelutong product which consists in coagulating Jelutong latex, subjecting the coagulant to melting heat until the same is melted and the water is expelled so as to be substantially less than five per cent, pouring the melted mass into molds and permitting the same to cool.

2. The method of producing a Jelutong product which consists in coagulating Jelutong latex, subjecting the coagulant to melting heat until the same is melted and the water is reduced to approximately three per cent of the mass, pouring the melted mass into molds and permitting the same to cool.

3. A new product consisting of a solid mass of cast Jelutong coagulant containing substantially less than five per cent of water and highly resistant to oxidation.

4. A new product consisting of a solid mass of cast Jelutong coagulant containing not more than approximately three per cent of water.

5. A new product consisting of a solid mass of cast Jelutong coagulant containing less than three per cent of water.

In testimony whereof, I have signed my name to this specification this 20th day of September, 1927.

SHELDON S. YATES.